US010221955B2

(12) United States Patent
Yamaguchi

(10) Patent No.: US 10,221,955 B2
(45) Date of Patent: Mar. 5, 2019

(54) VALVE DEVICE

(71) Applicant: PIOLAX, INC., Yokohama-shi (JP)

(72) Inventor: Kosei Yamaguchi, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/345,650

(22) Filed: Nov. 8, 2016

(65) Prior Publication Data

US 2017/0138493 A1    May 18, 2017

(30) Foreign Application Priority Data

Nov. 12, 2015    (JP) .................................. 2015-222012

(51) Int. Cl.
| *F16K 17/196* | (2006.01) |
| *F16K 15/02* | (2006.01) |
| *F16K 27/02* | (2006.01) |
| *B60K 15/035* | (2006.01) |
| *B60K 15/03* | (2006.01) |

(52) U.S. Cl.
CPC ...... *F16K 17/196* (2013.01); *B60K 15/03519* (2013.01); *F16K 15/026* (2013.01); *F16K 27/0209* (2013.01); *B60K 2015/03296* (2013.01); *Y10T 137/7772* (2015.04); *Y10T 137/7776* (2015.04); *Y10T 137/7777* (2015.04); *Y10T 137/7779* (2015.04)

(58) Field of Classification Search
CPC .. F16K 17/196; F16K 15/026; F16K 27/0209; B60K 15/03519; B60K 2015/03296
See application file for complete search history.

(56) References Cited

U.S. PATENT DOCUMENTS

| 5,944,044 | A | * | 8/1999 | King | ................ | B60K 15/03519 |
| | | | | | | 137/202 |
| 6,196,258 | B1 | * | 3/2001 | Araki | ............... | B60K 15/03504 |
| | | | | | | 137/493.4 |
| 6,701,952 | B1 | * | 3/2004 | Ehrman | ........... | B60K 15/03519 |
| | | | | | | 137/202 |
| 2011/0226356 | A1 | | 9/2011 | Yamaguchi | | |

FOREIGN PATENT DOCUMENTS

WO    WO 2010/064475 A1    6/2010

* cited by examiner

*Primary Examiner* — Mary McManmon
*Assistant Examiner* — Patrick Williams
(74) *Attorney, Agent, or Firm* — McGinn I.P. Law, Group, PLLC.

(57) ABSTRACT

One embodiment relates to a valve device. The valve device includes: a valve case; a valve element slidably disposed within a valve chamber defined in the valve case; and a positive pressure spring configured to urge the valve element toward a valve seat in the valve case. The valve element includes an outer circumferential portion having a predetermined length extending along an inner circumference of the valve chamber. The outer circumferential portion includes plural opening portions. And, ribs project from the inner circumference of the valve chamber to enter into the opening portions, thereby limiting movement of the positive pressure spring in a radial direction.

18 Claims, 9 Drawing Sheets

VALVE DEVICE

CROSS-REFERENCE TO RELATED APPLICATION(S)

This application claims priority from Japanese Patent Application No. 2015-222012 filed on Nov. 12, 2015, the entire contents of which are incorporated herein by reference.

FIELD

The present invention relates generally to a valve device mounted on a fuel tank of an automobile or the like and used for a check valve or the like.

BACKGROUND

In general, a check valve is mounted on a fuel tank of an automobile or the like, the check valve being arranged to make a fuel vapor flow outside to prevent the fuel tank from bursting when the pressure in the fuel tank rises to a predetermined value or more. On the other hand, intake of the outer air from the outside of the fuel tank prevents the fuel tank from being crushed when the pressure in the fuel tank falls to a predetermined value or less with respect to outside air pressure.

For example, WO-2010-064475-A discloses a check valve that includes a casing main body including a positive pressure valve seat inside, a sub-casing, a positive pressure valve including a negative pressure valve seat, and a negative pressure valve attached to the positive pressure valve seat. A positive pressure spring to urge the positive pressure valve toward the positive pressure valve seat is provided between the positive pressure valve and the sub-casing. The positive pressure valve is arranged to move away from the positive pressure valve seat when the pressure in a fuel tank rises to a predetermined value or more. The negative pressure valve is arranged to move away from the negative pressure valve seat when the pressure in the fuel tank falls to a predetermined value or less.

The positive pressure valve has a cylindrical shape extending long enough to cover the entire circumference of the positive pressure spring. Spring holding ribs protrude on the inner circumference of the positive pressure valve. The positive pressure spring is supported by the sub-casing at the base end, and the distal end is inserted into the positive pressure valve. The positive pressure spring is held by the spring holding ribs in the predetermined range from the distal end without inclination.

In the check valve, the positive pressure valve is configured to slide inside a valve case to abut on and separate from the positive pressure valve seat. To precisely set the pressures at which the positive pressure valve abuts on and separates from the positive pressure valve seat, the positive pressure spring needs to be disposed without inclination with respect to the axial center of the valve case. This is because, if the positive pressure spring is inclined, the urging force of the positive pressure spring could change.

However, in the case of the check valve of WO-2010-064475-A, the positive pressure spring is partially inserted into the inner circumference of the positive pressure valve in the predetermined range from the distal end, which holds the positive pressure spring at the spring holding ribs. Therefore, if the positive pressure valve is inclined, the positive pressure spring is also inclined accordingly. This may affect the opening responsiveness of the valve.

SUMMARY

An aspect of the present invention provides a valve device including: a valve case including: a first flow port defined on one end side of the valve case, the first flow port to be communicated with an inside of a fuel tank; a second flow port defined on the other end side of the valve case, the second flow port to be communicated with an outside of the fuel tank; a valve chamber defined inside the valve case; and a valve seat formed on an opening portion which communicates with the first flow port; a valve element slidably disposed in the valve chamber of the valve case, and including: a sealing portion configured to abut on and separate from the valve seat; and an outer circumferential portion having a predetermined length extending along an inner circumference of the valve chamber; and a positive pressure spring inserted into an inner side of the outer circumferential portion of the valve element, disposed to abut on the valve element at an one end thereof while abutting on the other end side of the valve case at the other end thereof, and configured to urge the valve element toward the valve seat of the valve case, wherein the outer circumferential portion of the valve element includes plural opening portions formed to extend in an axial direction of the outer circumferential portion, and disposed at predetermined intervals in a circumferential direction of the outer circumferential portion, and wherein the valve chamber of the valve case includes ribs formed on the inner circumference of the valve chamber to project therefrom in a radial inner direction of the valve case, and disposed to each pass through the opening portions of the valve element to thereby limit movement of the positive pressure spring in a radial direction.

There may be provided the valve device, wherein the ribs are disposed in a range covering a movement locus of the one end side of the positive pressure spring.

There may be provided the valve device, wherein an equation A>B is satisfied, where A is a gap between an inner circumference of the valve case and an outer circumference of the valve element, and B is a gap between end faces of the ribs in a protruding direction and an outer circumference of the positive pressure spring, in a state where an axial center of the valve case, an axial center of the valve element and an axial center of the positive pressure spring are arranged concentric.

There may be provided the valve device, wherein the valve element includes a through passage, and a negative pressure valve seat at an opening of the through passage which communicates with a side of the fuel tank, wherein the valve device further includes a negative pressure valve slidably disposed in the through passage to open and close the negative pressure valve seat, and a negative pressure spring disposed in the valve element to urge the negative pressure valve in a direction of closing the negative pressure valve seat, wherein the valve element includes a guide wall disposed on an inner side of a portion of the valve element where the positive pressure spring is disposed, and arranged to guide an outer circumference of the negative pressure spring, the valve element and the guide wall being formed in one piece, and wherein an equation A−B<C is satisfied, where C is a gap between an inner circumference of the positive pressure spring and an outer circumference of the guide wall, in the state where the axial center of the valve case, the axial center of the valve element and the axial center of the positive pressure spring are arranged concentric.

With the above-described valve device, since the outer circumferential portion of the valve element includes the plural opening portions, and the ribs protruding from the inner circumference of the valve chamber in the radial inner direction of the valve case are disposed to each pass through the opening portions of the valve element to limit movement of the positive pressure spring in the radial direction, even when the valve element is inclined in the valve chamber, the inclination of the positive pressure spring can be suppressed by the ribs provided to the valve case that has no influence on the inclination of the valve element. As a result, the above-described valve device can suppress the change in urging force of the positive pressure spring to improve the opening responsiveness of the valve element, which allows the valve element to be opened at predetermined valve opening pressure with high precision.

DETAILED DESCRIPTION

Figure 1:
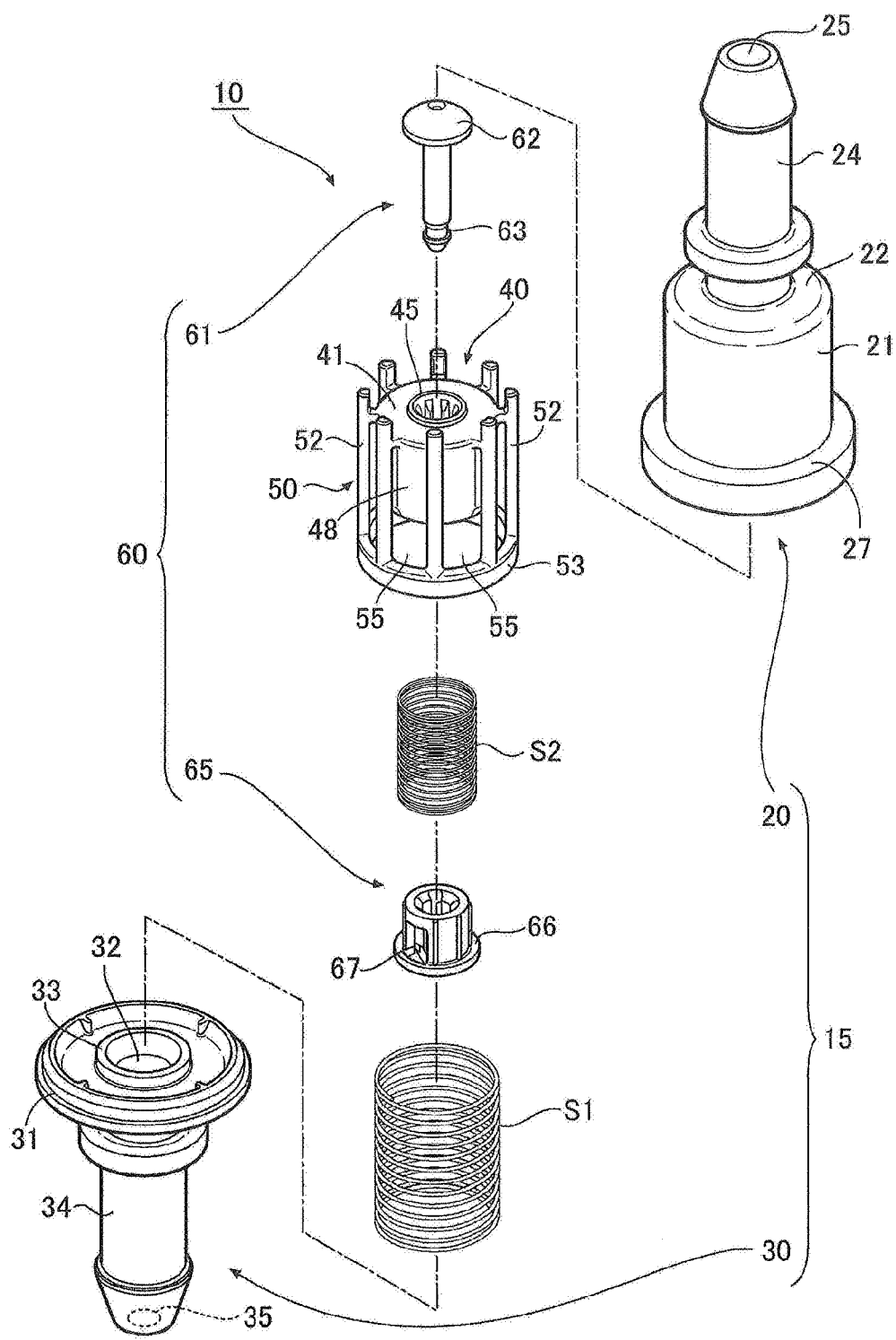
FIG. 1 is an exploded perspective view of a valve device according to one embodiment.

A valve device according to one embodiment will be described referring to the drawing.

Figure 2:
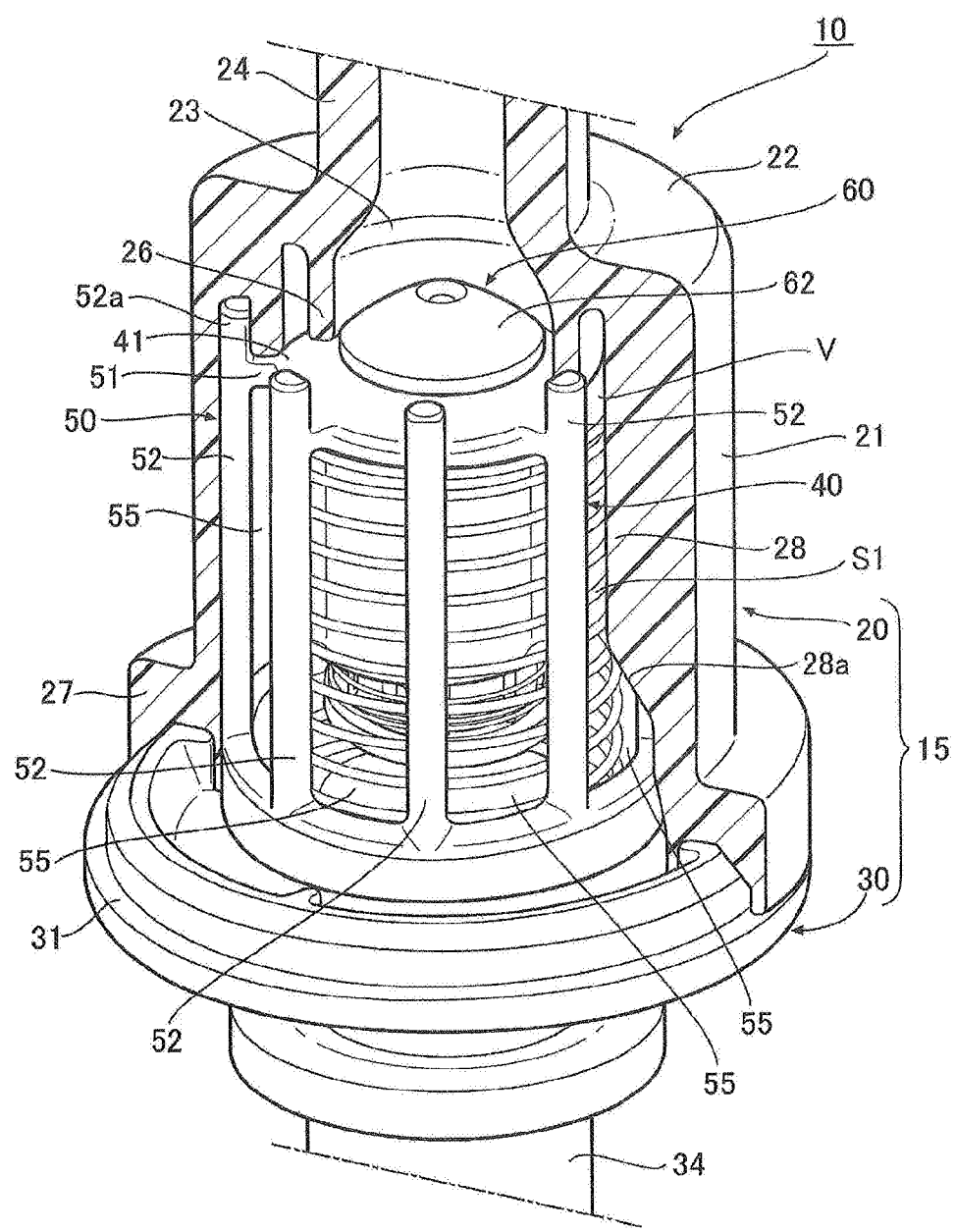
FIG. 2 is a partial cross-sectional perspective view of the valve device showing a cross section of a case main body of a valve case in a longitudinal direction.

As shown in FIGS. 1 and 2, a valve device 10 according to the present embodiment includes a valve case 15 having a first flow port 25 on one end side, the first flow port 25 communicating with the inside of a fuel tank, a second flow port 35 on the other end side, the second flow port 35 communicating with the outside of the fuel tank, a valve chamber V inside, and a valve seat 26 that is provided to an opening portion 23 communicating with the first flow port 25. A valve element 40 is slidably disposed in the valve chamber V of the valve case 15 and includes a negative pressure valve seat 45, a positive pressure spring S1 arranged to urge the valve element 40 toward the valve seat 26 of the valve case 15. A negative pressure valve 60 including a main body 61 and a cap 65 and slidably attached to the valve element 40, and a negative pressure spring S2 arranged to urge the negative pressure valve 60 in a direction of closing the negative pressure valve seat 45.

Firstly, the valve case 15 will be described. The valve case 15 includes a case main body 20 and a sub-case 30 that is attached to the case main body 20 to form a valve chamber V.

The case main body 20 includes a circumferential wall 21 having an approximately circular cylindrical shape, and a ceiling wall 22 disposed on one end side of the circumferential wall 21. An opening portion 23 communicating with the valve chamber V is provided in the center of the ceiling wall 22, and a first connecting portion 24 extends from the rim on the outside of the opening portion 23. One end of the first connecting portion 24 forms the first flow port 25. A pipe (not illustrated) communicating with the fuel tank is connected to the first connecting portion 24.

A valve seat 26 having a circular cylindrical shape protrudes from the rim on the back side of the opening portion 23 of the ceiling wall 22. A sealing portion 41 of the valve element 40 to be describe later is arranged to abut on and separate from the valve seat 26 to close the opening portion 23 (see FIGS. 4, 8, and 9).

The valve seat 26 according to the present embodiment protrudes from the rim on the back side of the opening portion 23. Meanwhile, the valve seat 26 may be disposed at a position apart from the opening portion 23, as long as a sealing portion 41 of the valve element 40 is capable of abutting on and separating from the valve seat 26 to open and close the opening portion 23. An annular flange portion 27 for attachment to the sub-case 30 extends from the rim of the opening of the circumferential wall 21 on the base end side.

Ribs 28 are provided on the inner circumference of the valve chamber V. The ribs 28 relate with opening portions 55 provided to the valve element 40. The ribs 28 and the opening portions will be described later.

The sub-case 30 includes a lid member 31 having a disk shape including an opening portion 32 in its center. A second connecting portion 34 having a cylindrical shape extends from the rim on the external surface of the opening portion 32. The second flow port 35 is provided to the second connecting portion 34 on the distal end side (i.e., provided to the valve case 15 on the other end side). The outer circumferential portion of the lid member 31 is joined to the annular flange portion 27 of the case main body 20 by welding or the like, whereby the sub-case 30 is attached to the case main body 20. An annular spring supporting seat 33 arranged to support one end of the positive pressure spring S1 protrudes from the rim on the outside of the opening portion 32 of the lid member 31. A pipe (not illustrated) communicating with a canister disposed outside of the fuel tank is connected to the second connecting portion 34.

Next, the valve element 40 will be described with reference to FIGS. 3 to 5. The valve element 40 according to the present embodiment functions as a positive pressure valve in cooperation with a negative pressure valve 60 to be described later. The valve element 40 includes the sealing portion 41 having an approximately disk shape, and an outer circumferential portion 50 having a predetermined length extending along the inner circumference of the valve chamber V, and the positive pressure spring S1 is inserted to be disposed in the inner side of the outer circumferential portion.

A through-hole is provided at the center of the sealing portion 41, a cylindrical wall 46 extends from the rim on the back side of the through-hole, and the inner cavity of the cylindrical wall 46 forms a through passage 43. The main body 61 of the negative pressure valve 60 to be described later is disposed slidablly in the through passage 43. The rim on the base end side of the cylindrical wall 46 that is the back side of the sealing portion 41 functions as a portion to support one end of the negative pressure spring S2 by making the one end abut on the rim (see FIG. 4). The annular negative pressure valve seat 45 protrudes from the rim on the outside of the opening of the through passage 43, the opening communicating with the fuel tank.

Figure 3:
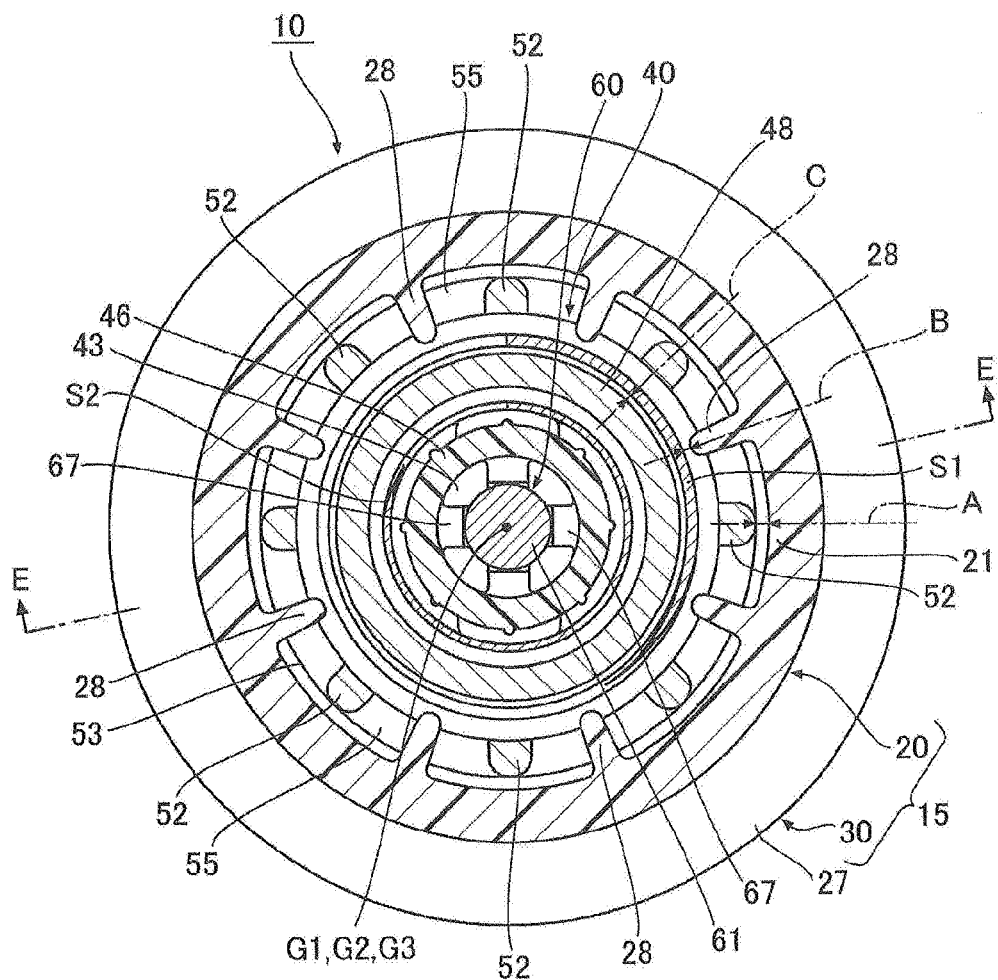
FIG. 3 is a lateral cross-sectional view of the valve device.

As shown in FIG. 3, plural supporting ribs 47 are provided in the axial direction on the inner circumference of the cylindrical wall 46 so as to be equally spaced in the circumferential direction, and are arranged to slidably support the main body 61 of the negative pressure valve 60.

A guide wall 48 arranged to guide the outer circumference of the negative pressure spring S2 is provided to the valve element 40 to be disposed in the inner side of the outer circumferential portion 50 where the positive pressure spring S1 is disposed. The guide wall 48 and the valve element 40 are formed in one piece. The guide wall 48 having a circular cylindrical shape and a predetermined length is disposed on the back side of the sealing portion 41 in the inner side of the outer circumferential portion 50 on the outer circumference of the cylindrical wall 46 in a concentric fashion with the cylindrical wall 46.

The outer circumferential portion 50 of the valve element 40 includes the plural opening portions 55 extending in the axial direction of the outer circumferential portion 50 while disposed at predetermined intervals in the circumferential direction of the outer circumferential portion 50. In the present embodiment, the opening portions 55 are formed as follows.

The outer circumferential portion 50 is formed by connecting plural protruding pieces 51 that radially protrude from the outer circumference of the disk-shaped sealing portion 41 so as to be equally spaced in the circumferential direction with columnar portions 52 that extend along the axial direction of the valve element 40, and connecting the base end portions of the columnar portions 52 (the end portions apart from the sealing portion 41) with an annular connecting portion 53.

Then, the opening portions 55 extending in the axial direction of the outer circumferential portion 50 are formed between the columnar portions 52 and 52 that are adjacent to each other in the circumferential direction while the opening portions 55 communicate with the interior space of the valve element 40. Thus, the plural opening portions 55 are disposed at predetermined intervals in the circumferential direction. While the positive pressure spring S1 is inserted to be disposed in the inner side of the outer circumferential portion 50, the positive pressure spring S1 is exposed from the outer circumference of the valve element 40 since the plural opening portions 55 are provided.

Figure 4:
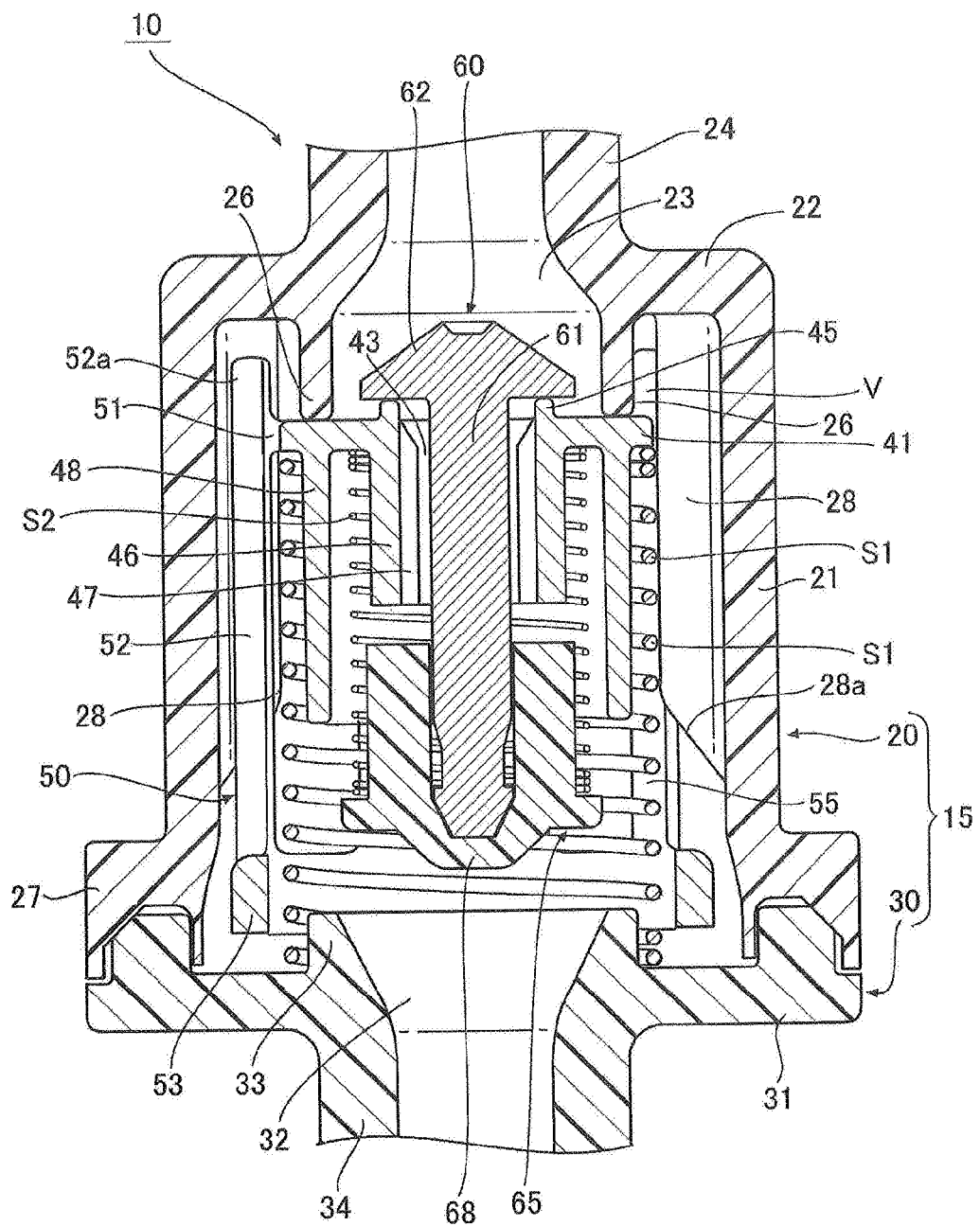
FIG. 4 is a cross-sectional view of the valve device taken along the line E-E of FIG. 3.
Figure 5:
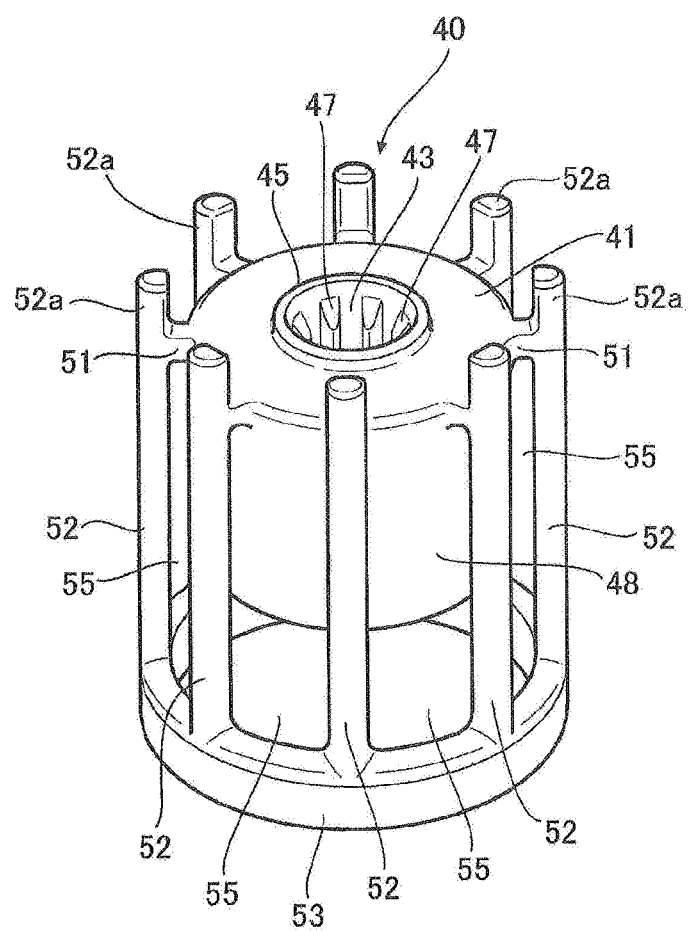
FIG. 5 is a perspective view of a valve element that makes up the valve device.

One end of the positive pressure spring S1 abuts on to support the protruding pieces 51 (FIG. 4). As shown in FIGS. 3 and 5, each of the columnar portions 52 has a circular arc shape on its outer circumferential surface while having a flat columnar shape on its inner circumferential surface. In the present embodiment, the distal end portions 52a of the columnar portions 52 protrude higher than the surface of the sealing portion 41 (the surface where the negative pressure valve seat 45 is provided). The distal end portions 52a get in small space provided among the circumferential wall 21, the ceiling wall 22, and the valve seat 26 of the case main body 20 to improve the sliding guiding effect of the valve element 40; however, the distal end portions 52a do not necessarily have to protrude higher than the surface of the sealing portion 41. The columnar portions 52 extend longer on their base end side than the cylindrical wall 46 and the guide wall 48 that extend from the back surface of the sealing portion 41.

While eight pieces of the protruding pieces 51, eight pieces of the columnar portions 52, and eight pieces of the opening portions 55 are provided in the present embodiment, the numbers thereof are not limited specifically, and three pieces or more are preferable, and six pieces or more are more preferable.

The outer circumferential portion 50 according to the present embodiment has a shape like a cage made of the plural columnar portions 52 extending in the axial direction, the connecting portion 53 annularly connecting the base end portions of the columnar portions 52, and the plural opening portions 55 extending in the axial direction (see FIG. 5); however, the shape is not limited to this shape. For example, the "outer circumferential portion" may be formed by providing a cylindrical wall extending in the axial direction from the rim on the outer circumference of the sealing portion 41, and providing the cylindrical wall with plural opening portions 55 in the circumferential direction, the opening portions 55 extending in the axial direction.

As shown in FIG. 4, the other end of the positive pressure spring S1 urging the valve element 40 is supported by the spring supporting seat 33 of the sub-case 30 while one end of the positive pressure spring S1 is inserted into the inner side of the outer circumferential portion 50 of the valve element 40 to abut on to be supported by the plural protruding pieces 51, whereby the positive pressure spring S1 is disposed under compression between the lid member 31 of the sub-case 30 and the valve element 40 in the valve case 15. As a result, the valve case 40 is urged by the valve seat 26 of the valve case 15 so as to abut thereon, whereby the sealing portion 41 of the valve element 40 is made to abut on the valve seat 26 in a normal state (see FIG. 4). When the pressure in the fuel tank rises to a predetermined value or more, and the valve element 40 is pressed by a fuel vapor, the positive pressure spring S1 is compressed, whereby the valve element 40 is made to slide in the valve chamber V to move the sealing portion 41 separate from the valve seat 26 to open the opening portion 23 (see FIG. 8).

The positive pressure spring S1 has an outside diameter slightly larger than the outside diameter of the sealing portion 41 of the valve element 40 in a state where one end of the positive pressure spring S1 is supported by the protruding pieces 51 of the sealing portion 40 as shown in FIG. 4 in the present embodiment; however, the outside diameter of the positive pressure spring S1 may be set equal to or smaller than the outside diameter of the sealing portion 41.

Next, the negative pressure valve 60 will be described. The negative pressure valve 60 includes the main body 61 and the cap 65, and is slidably attached to the valve element 40. The negative pressure valve 60 is dispensable. In such a case, the through passage 43 is not provided and the sealing portion 41 has a closed shape.

Figure 6:
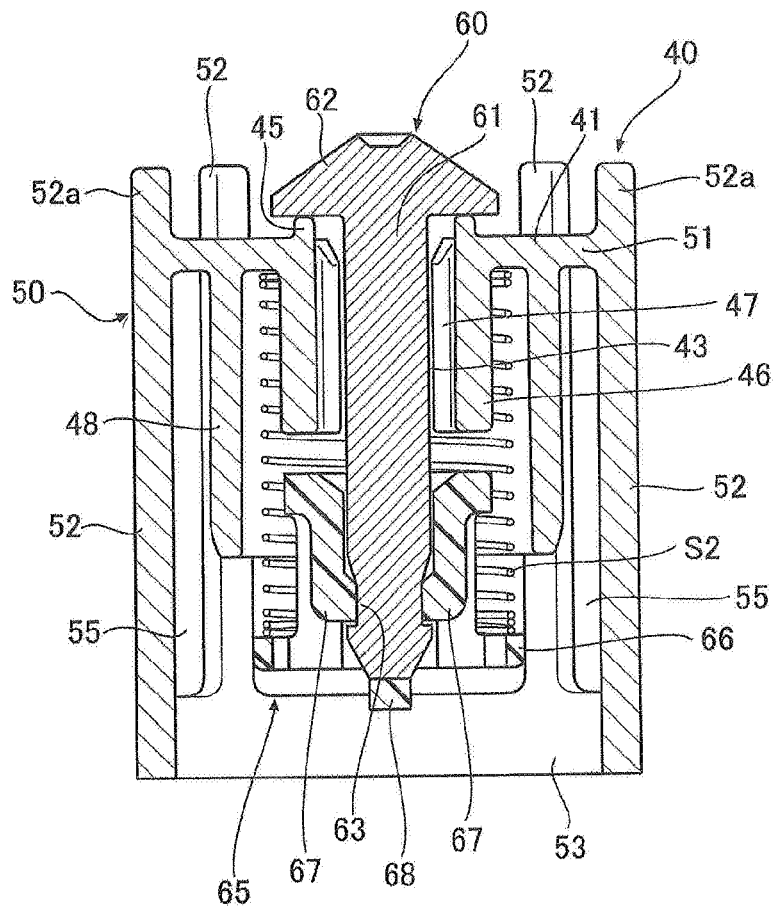
FIG. 6 is a cross-sectional view of the valve element and a negative pressure valve that make up the valve device.
Figure 7:
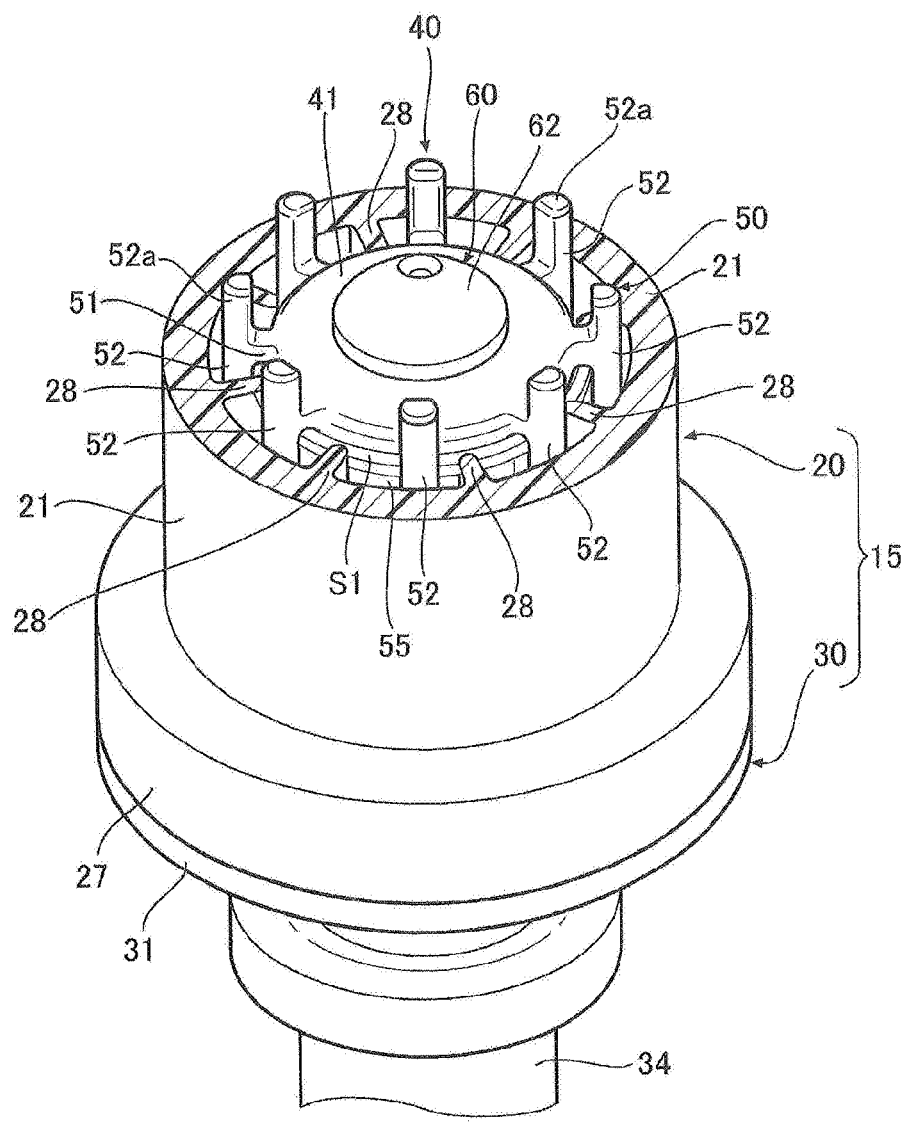
FIG. 7 is a partial cross-sectional perspective view of the valve device showing a cross section of the case main body of the valve case in a predetermined lateral direction.

The main body 61 of the negative pressure valve 60 extends in a columnar shape, and is inserted into the through passage 43 of the valve element 40 to be slidably supported by the supporting ribs 47 of the valve element 40 as shown in FIGS. 1, 4, and 6. A valve head 62 having an umbrella shape arranged to abut on and separate from the negative pressure valve seat 45 of the valve element 40 to open and close the opening of the through passage 43 on the tank side is provided to the main body 61 at the base end portion. An annular engaged concave portion 63 is provided to the main body 61 at the distal end portion.

The cap 65 has a cylindrical shape of receiving the main body 61, and includes a spring seat 66 arranged to support the other end of the negative pressure spring S2 and protruding from the outer circumference of the cap 65 at the base end. A pair of engaging pawls 67 and 67 with which the engaged concave portion 63 of the main body 61 is engaged are provided to the cap 65 on the inner circumference as shown in FIG. 6. A supporting piece 68 arranged to support the distal end of the main body 61 is provided to the opening of the cap 65 on the base end side so as to bestride the opening (see FIG. 4).

One end of the negative pressure spring S2 is supported by the rim on the base end side of the cylindrical wall 46 of the valve element 40 while the other end of the negative pressure spring S2 is supported by the spring seat 66, and the main body 61 is inserted into the through passage 43 of the valve element 40 to make the engaged concave portion 63 engaged with the pair of engaging pawls 67 and 67 of the cap 65, whereby the negative pressure valve 60 can be slidably attached to the valve element 40 in a state where the negative pressure spring S2 is compressed (see FIG. 6). In this state, the negative pressure valve 60 is urged in the direction of closing the negative pressure valve seat 45 of the valve element 40 by the urging force of the negative pressure spring S2, and the valve head 62 of the main body 61 abuts on the negative pressure valve seat 45 in a normal state (see FIG. 4).

Figure 9:
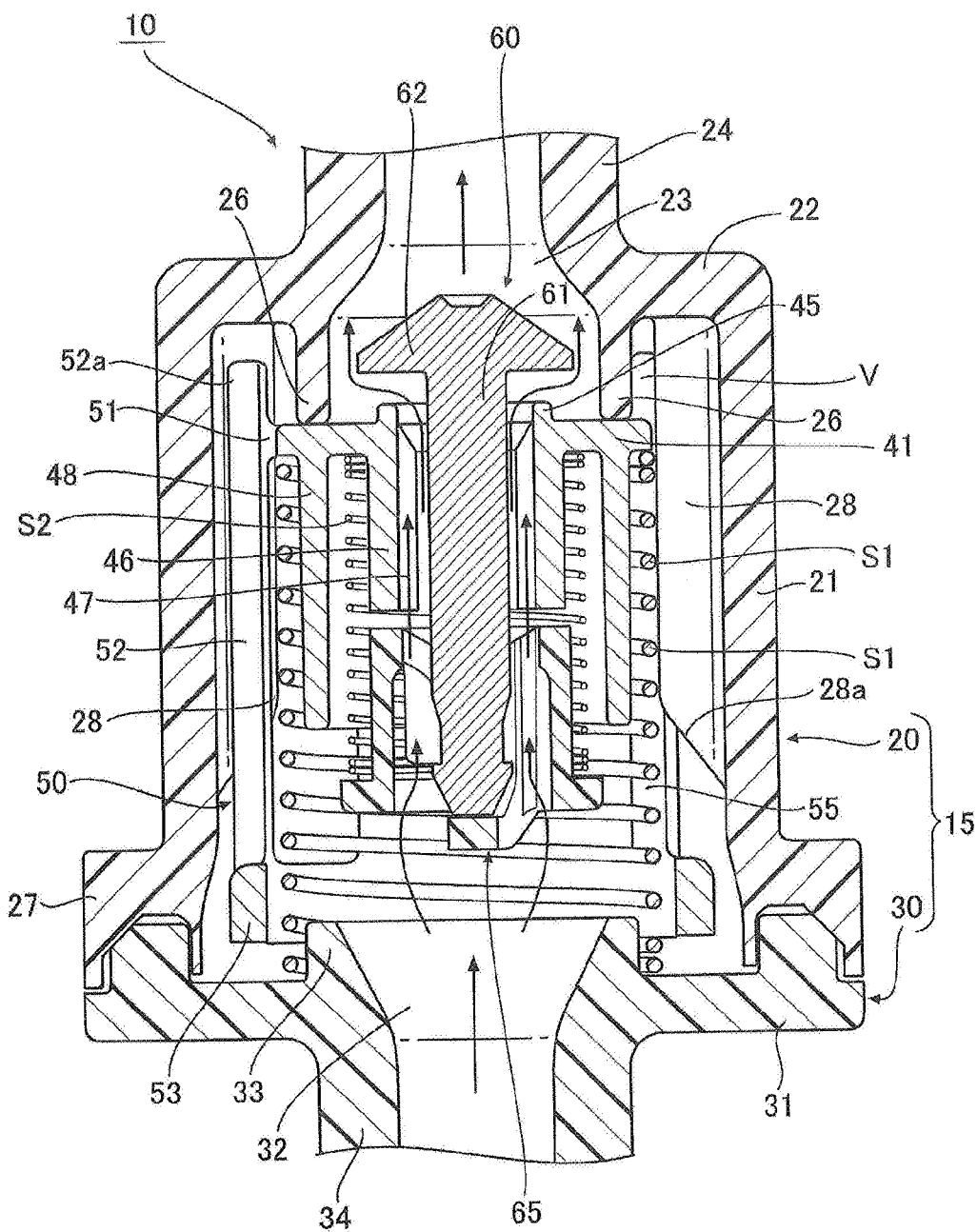
FIG. 9 is an enlarged cross-sectional view of relevant components of the valve device showing a state where the pressure in a fuel tank becomes negative pressure with respect to outside air pressure to fall to a predetermined value or less.

When the pressure in the fuel tank falls to a predetermined value or less with respect to outside air pressure, the negative pressure valve 60 is pressed by the outside air to slidably move with respect to the valve element 40 against the urging force of the negative pressure spring S2, and thus the valve head 62 of the negative pressure valve 60 separates from the negative pressure valve seat 45 of the valve element 40 (see FIG. 9). As a result, the outside air from the outside of the fuel tank passes through the through passage 43 of the valve element 40 to flow out through the space between the valve head 62 and the negative pressure valve seat 45 to flow into the first connecting portion 24 through the opening portion 23 (see FIG. 9).

Next, the ribs 28 provided on the inner circumference of the valve chamber V of the valve case 15 will be described. As shown in FIGS. 2 to 4, and 7, the ribs 28 protrude from the inner circumference of the valve chamber V of the valve case 15 in the radial inner direction of the valve case 15 to be disposed so as to each pass through the opening portions 55 of the valve element 40 to limit movement of the positive pressure spring S1 in the radial direction.

The plural ribs 28 according to the present embodiment have a thin plate shape, and protrude from the inner circumferential surface of the circumferential wall 21 of the case main body 20 toward the axial center G1 of the valve case 15 (see FIG. 3) at predetermined intervals.

The ribs 28 are connected at one end portions with the ceiling wall 22 of the case main body 20, and have a predetermined length to extend along the axial direction of the valve case 15 (sees FIGS. 2 and 4). In the present embodiment, the ribs 28 are disposed in a range at least covering a movement locus L of one end side (the side of the positive pressure spring S1 on which the valve element 40 abuts) of the positive pressure spring S1. The movement locus L is assumed correspondingly with the sliding movement of the valve element 40 such that the sealing portion 41 of the valve element 40 moves away from the valve seat 26 of the valve case 15 (see FIG. 8) from the state where the sealing portion 41 abuts on the valve seat 26 (see FIG. 4). A tapered surface 28a is provided to each of the ribs 28 at their base end portions on the inner surface sides, whereby the ribs 28 are made not to get easily snagged by the wire of the positive pressure spring S1.

The ribs 28 are disposed close to the outer circumference of the sealing portion 41 of the valve element 40 via a tiny gap while disposed also close to the outer circumference of the positive pressure spring S1 as shown in FIG. 4. While the ribs 28 are preferably disposed close to at least the sealing portion 41 of the valve element 40, the ribs 28 may be disposed close to or may not be disposed close to the other constituent elements other than the sealing portion 41 of the valve element 40. This configuration can keep the posture of the valve element 40 at the time when the sealing portion 41 of the valve element 40 abuts on the valve seat 26, which can improve seal performance As shown in FIG. 3, an equation A>B holds assuming that the gap between the inner circumference of the valve case 15 and the outer circumference of the valve element 40 is A (i.e., the gap between the inner circumference of the circumferential wall 21 of the case main body 20 and the outer circumferential surfaces of the columnar portions 52 of the valve element 40 in the present embodiment), and the gap between the end faces of the ribs 28 in the protruding direction and the outer circumference of the positive pressure spring S1 is B in a state where the valve element 40 and the positive pressure spring S1 are disposed in a manner that an axial center G2 of the valve element 40 and an axial center G3 of the positive pressure spring S1 are in a concentric fashion with an axial center G1 of the valve case 15.

In the present embodiment, the following relation holds because the negative pressure valve 60 is provided to the valve element 40. An equation A−B<C holds assuming that the gap between the inner circumference of the positive pressure spring S1 and the outer circumference of the guide wall 48 of the valve element 40 is C in a state where the valve element 40 and the positive pressure spring S1 are disposed in a manner that the axial center G2 of the valve element 40 and the axial center G3 of the positive pressure spring S1 are in a concentric fashion with the axial center G1 of the valve case 15 similarly to the above case (see FIG. 3).

The number of the ribs 28 according to the present embodiment is made to conform to the number of the opening portions 55 of the valve element 40 (eight pieces in the present embodiment), and the ribs 28 are each inserted into the opening portions 55 of the valve element 40, so that the rotation of the valve element 40 with respect to the valve case 15 can be controlled. The number of the ribs 28 is not limited specifically; however, three pieces or more are preferable, and six pieces or more are more preferable.

Next, the operation and advantageous effect of the valve device 10 will be described.

For example, the valve device 10 is installed inside the fuel tank or outside the fuel tank with the use of clips or brackets (not illustrated) in a state where a pipe installed inside the fuel tank to be connected with a cut valve and the like is connected to the first connecting portion 24 while a pipe connected with a canister and the like installed outside the fuel tank is connected to the second connecting portion 34.

When the pressure in the fuel tank falls to a predetermined value or less, the sealing portion 41 of the valve element 40 urged by the urging force of the positive pressure spring S1 abuts on the valve seat 26 of the valve case 15 to close the opening portion 23, and the valve head 62 of the negative pressure valve 60 urged by the urging force of the negative pressure spring S2 abuts on the negative pressure valve seat 45 of the valve element 40 to close the through passage 43 of the valve element 40 as shown in FIG. 4.

Figure 8:
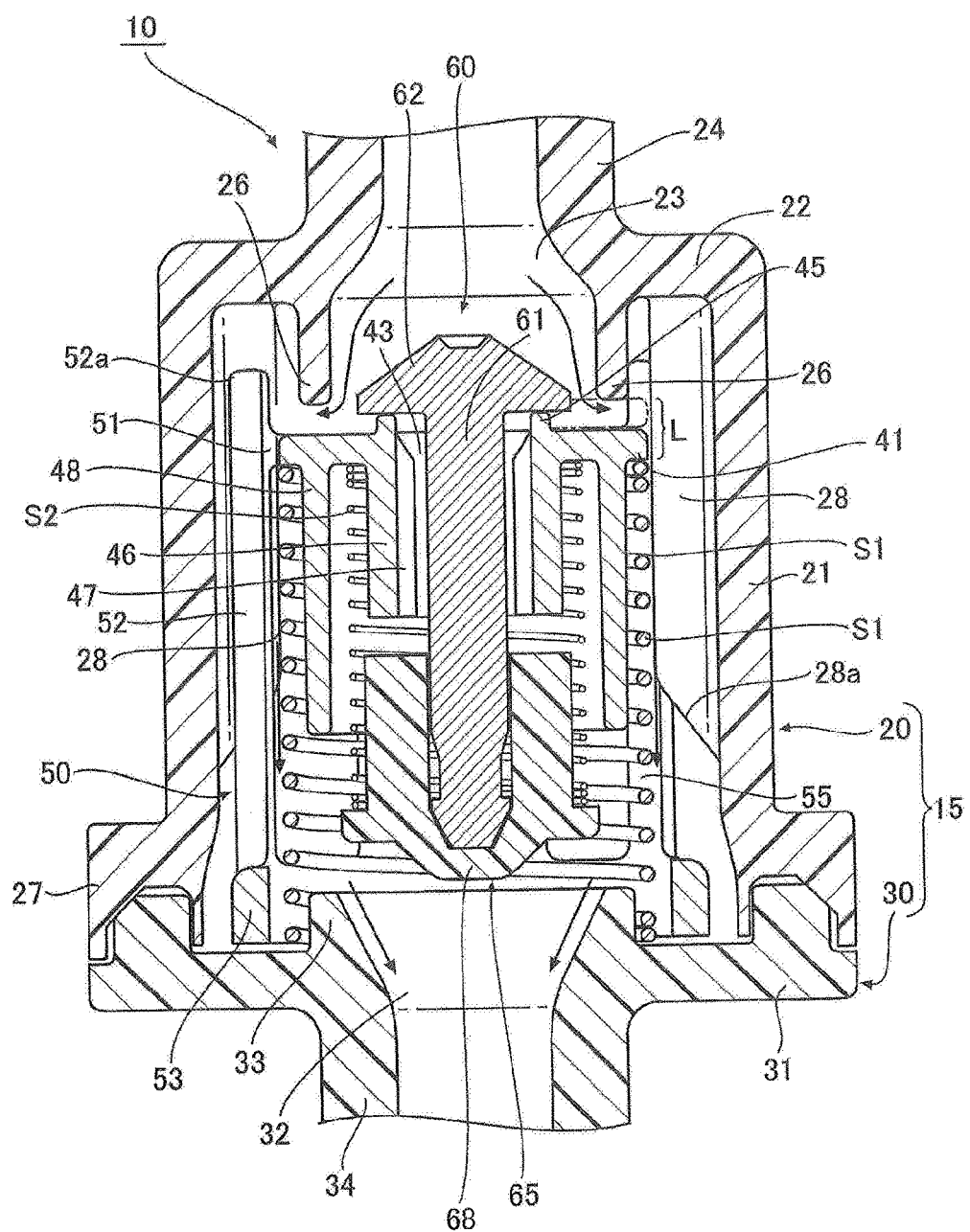
FIG. 8 is an enlarged cross-sectional view of relevant components of the valve device showing a state where the pressure in a fuel tank rises to a predetermined value or more.

When the pressure in the fuel tank rises to a predetermined value or more in the above-described state, a fuel vapor and the like tries to flow out of the opening portion 23 through the first connecting portion 24 to press the valve element 40. Then, the entire valve element 40 slides toward the second connecting portion 34 (toward the sub-case 30) of the valve case 15 against the positive pressure spring S1, and the sealing portion 41 of the valve element 40 moves away from the valve seat 26 of the valve case 15 to open the opening portion 23 as shown in FIG. 8. Then, as indicated by the arrows in FIG. 8, the fuel vapor flows between the inner circumference of the case main body 20 and the outer circumference of the valve element 40 while passing through the opening portion 55 of the valve element 40 to flow into the opening portion 32 of the sub-case 30 to be sent to the inside of the second connecting portion 34 and the canister and the like via a pipe (not illustrated) to be discharged outside the fuel tank, which can reduce the pressure in the fuel tank.

Because the gap A of a predetermined distance is provided between the valve element 40 and the inner circumference of the valve case 15 (see FIG. 3), the valve element 40 could be inclined when the valve element 40 slides in the valve case 15. However, in the valve device 10 according to the present embodiment, the responsiveness can be improved by keeping the valve opening pressure at the time the valve element 40 is opened to be constant even when the valve element 40 is inclined.

In the valve device 10 according to the present embodiment, since the outer circumferential portion 50 of the valve element 40 includes the plural opening portions 55, and the ribs 28 protruding from the inner circumference of the valve chamber in the radial inner direction of the valve case 15 are disposed to each pass through the opening portions 55 of the valve element 40 to limit movement of the positive pressure spring S1 in the radial direction, even when the valve element 40 is inclined in the valve chamber, the inclination of the positive pressure spring S1 can be suppressed by the ribs 28 provided to the valve case 15 that has no influence on the inclination of the valve element 40 as shown in FIGS. 2 to 4, and 7. As a result, the valve device 10 can suppress the change in urging force of the positive pressure spring S1 to improve the opening responsiveness of the valve element 40, which allows the valve element 40 to be opened smoothly at predetermined valve opening pressure with high precision (see FIG. 8).

Since the ribs 28 are disposed in the range covering the movement locus L of one end side of the positive pressure spring S1 as shown in FIG. 8 in the present embodiment, at least the inclination of the positive pressure spring S1 on one end side can be suppressed, whereby the inclination of the positive pressure spring S1 can be effectively suppressed.

The equation A>B holds assuming that the gap between the inner circumference of the valve case 15 and the outer circumference of the valve element 40 is A and the gap between the end faces of the ribs 28 in the protruding direction and the outer circumference of the positive pressure spring S1 is B in a state where the valve element 40 and the positive pressure spring S1 are disposed in a manner that the axial center G2 of the valve element 40 and the axial center G3 of the positive pressure spring S1 are in a concentric fashion with the axial center G1 of the valve case 15 as shown in FIG. 3 in the present embodiment. Thus, by setting up the relation between A and B, even when the valve element 40 is largely inclined in the valve chamber, the inclination of the positive pressure spring S1 is hardly influenced by the inclination of the valve element 40, whereby the inclination of the positive pressure spring S1 can be more effectively suppressed.

The equation A−B<C holds assuming that the gap between the inner circumference of the positive pressure spring S1 and the outer circumference of the guide wall 48 of the valve element 40 is C in a state where the valve element 40 and the positive pressure spring S1 are disposed in a manner that the axial center G2 of the valve element 40 and the axial center G3 of the positive pressure spring S1 are in a concentric fashion with the axial center G1 of the valve case 15 as shown in FIG. 3 in the present embodiment. Thus, by setting up the relation among A, B, and C, even when the negative pressure valve 60 and the negative pressure spring S2 are attached to the valve element 40, and the guide wall 48 arranged to guide the outer circumference of the negative pressure spring S2 is provided to the valve element 40, the inclination of the positive pressure spring S1 can be suppressed by the ribs 28 of the valve case 15 without being influenced by the guide wall 48 when the valve element 40 is inclined.

When the pressure in the fuel tank falls to the predetermined value or less with respect to outside air pressure, the outside air is introduced into the valve chamber V from the opening portion 32 via the inside of the second connecting portion 34 of the sub-case 30 as shown in FIG. 9, and the outside air flows between the engaging pawls 67 and 67 of the cap 65 and inside the valve element 40 to press the umbrella-shaped valve head 62. Then, the negative pressure valve seat 45 opens, so that the outside air flows into the first connecting portion 24 from the opening portion 23 to be sent into the fuel tank via a pipe (not illustrated), whereby the pressure in the fuel tank can be made to rise. In FIG. 9, the orientation of the cap 65 in cross section is different from the orientation of the cap 65 with respect to the negative pressure valve seat 45 in FIGS. 4 and 8 in order to explain the introduction path for the outside air in a simplified manner.

The valve device 10 according to the above-described embodiment includes the negative pressure valve 60 in addition to the valve element 40, the negative pressure valve 60 functioning as a so-called check valve for adjusting the pressure in the tank; however only the valve element 40 may be provided without providing the negative pressure valve 60, which is not limited specifically.

The present invention is not limited to the embodiment described above, and it is also possible to add a variety of modifications to the embodiment. Such modifications will also fall within the scope of the present invention.

The invention claimed is:
1. A valve device, comprising:
 a valve case comprising:
  a first flow port defined on one end side of the valve case, the first flow port to be communicated with an inside of a fuel tank;
  a second flow port defined on an other end side of the valve case, the second flow port to be communicated with an outside of the fuel tank;
  a valve chamber defined inside the valve case; and
  a valve seat formed on an opening portion which communicates with the first flow port;
 a valve element slidably disposed in the valve chamber of the valve case, and comprising:

a sealing portion configured to abut on and be separate from the valve seat; and
an outer circumferential portion having a predetermined length extending along an inner circumference of the valve chamber; and
a positive pressure spring inserted into an inner side of the outer circumferential portion of the valve element, disposed to abut on the valve element at one end thereof while abutting on an other end side of the valve case at the other end thereof, and configured to urge the valve element toward the valve seat of the valve case,
wherein the outer circumferential portion of the valve element comprises plural opening portions formed to extend in an axial direction of the outer circumferential portion, and disposed at predetermined intervals in a circumferential direction of the outer circumferential portion, and
wherein the valve chamber of the valve case comprises ribs formed on the inner circumference of the valve chamber to project therefrom in a radial inner direction of the valve case, and disposed to each pass through the opening portions of the valve element, the ribs being exposed to the positive pressure spring to limit a movement of the positive pressure spring in a radial direction.

2. The valve device of claim 1, wherein the ribs are disposed in a range covering a movement locus of one end side of the positive pressure spring.

3. The valve device of claim 1, wherein an equation A >B is satisfied, where:
A is a gap between an inner circumference of the valve ease and an outer circumference of the valve element; and
B is a gap between end faces of the ribs in a protruding direction and an outer circumference of the positive pressure spring,
in a state where an axial center of the valve case, an axial center of the valve element and an axial center of the positive pressure spring are arranged concentric.

4. The valve device of claim 3, wherein the valve element comprises a through passage, and a negative pressure valve seat at an opening of the through passage which communicates with a side of the fuel tank,
wherein the valve device further comprises a negative pressure valve slidably disposed in the through passage to open and close the negative pressure valve seat, and a negative pressure spring disposed in the valve element to urge the negative pressure valve in a direction of closing the negative pressure valve seat,
wherein the valve element comprises a guide wall disposed on an inner side of a portion of the valve element where the positive pressure spring is disposed, and arranged to guide an outer circumference of the negative pressure spring, the valve element and the guide wall being formed in one piece, and
wherein an equation A−B<C is satisfied, where C is a gap between an inner circumference of the positive pressure spring and an outer circumference of the guide wall, in the state where the axial center of the valve case, the axial center of the valve element, and the axial center of the positive pressure spring are arranged concentric.

5. The valve device of claim 1, wherein, in a side view, the positive pressure spring is exposed to outside of the opening portions.

6. The valve device of claim 1, wherein, in the radial direction, the positive pressure spring is exposed to outside of the opening portions.

7. The valve device of claim 1, wherein the outer circumferential portion of the valve element further comprises columnar portions, each of the opening portions being between adjacent columnar portions of the columnar portions, and
wherein, in a top view, said each of the ribs is located between the adjacent columnar portions.

8. The valve device of claim 1, wherein the outer circumferential portion of the valve element further comprises columnar portions, each of the opening portions being, between adjacent columnar portions of the columnar portions, and
wherein, in a top view, said each of the ribs is completely located outside of the adjacent columnar portions.

9. The valve device of claim 1, wherein the outer circumferential portion of the valve element further comprises columnar portions each of the openinq portions being between adjacent columnar portions of the columnar portions, and
wherein, in the circumferential direction, said each of the ribs is located between adjacent columnar portions.

10. The valve device of claim 1, wherein the outer circumferential portion of the valve element further comprises columnar portions each of the opening, portions being he between adjacent columnar portions of the columnar portions, and
wherein, in the circumferential direction, said each of the ribs is completely located outside of the adjacent columnar portions.

11. The valve device of claim 1, wherein a number of ribs conform to a number of the opening portions.

12. The valve device of claim 1, wherein a number of ribs is equal to a number of the opening portions.

13. The valve device of claim 1, wherein the positive pressure spring is exposed to outside of the opening portions.

14. The valve device of claim 1, wherein a surface of the ribs faces a surface of the positive pressure spring.

15. The valve device of claim 1, wherein an inner circumference surface of the ribs faces an outer circumference surface of the positive pressure spring.

16. The valve device of claim 1, wherein an inner circumference surface of each of the ribs is exposed to an outer circumference surface of the positive pressure spring.

17. A valve device, comprising:
a valve case comprising:
a first flow port defined on one end side of the valve case, the first flow port to be communicated with an inside of a fuel tank;
a second flow port defined on an other end side of the valve case, the second flow port to be communicated with an outside of the fuel tank;
a valve chamber defined inside the valve case; and
a valve seat formed on an opening portion which communicates with the first flow port;
a valve element slidably disposed in the valve chamber of the valve case, and comprising:
a sealing portion configured to abut on and be separate from the valve seat; and
an outer circumferential portion having a predetermined length extending along an inner circumference of the valve chamber; and
a positive pressure spring inserted into an inner side of the outer circumferential portion of the valve element, disposed to abut on the valve element at an one end thereof while abutting on an other end side of the valve case at the other end thereof, and configured to urge the valve element toward the valve seat of the valve case, wherein the outer circumferential portion of the valve element comprises plural opening portions formed to extend in an axial direction of the outer circumferential portion, and disposed at predetermined intervals in a circumferential direction of the outer circumferential portion, wherein the valve chamber of the valve case comprises ribs formed on the inner circumference of the valve chamber to project therefrom in a radial inner direction of the valve case, and disposed to each pass through the opening portions of the valve element to limit a movement of the positive pressure spring in a radial direction, and wherein, in a side view, the positive pressure spring is exposed to outside of the opening portions.

18. A valve device, comprising:
a valve case comprising:
   a first flow port defined on one end side of the valve case, the first flow port to be communicated with an inside of a fuel tank;
   a second flow port defined on an other end side of the valve case, the second flow port to be communicated with an outside of the fuel tank;
   a valve chamber defined inside the valve case; and
   a valve seat formed on an opening portion which communicates with the first flow port;

a valve element slidably disposed in the valve chamber of the valve case, and comprising:
   a sealing portion configured to abut on and be separate from the valve seat; and
   an outer circumferential portion having a predetermined length extending along an inner circumference of the valve chamber; and a positive pressure spring inserted into an inner side of the outer circumferential portion of the valve element, disposed to abut on the valve element at an one end thereof while abutting on an other end side of the valve case at the other end thereof, and configured to urge the valve element toward the valve seat of the valve case, wherein the outer circumferential portion of the valve element comprises plural opening portions formed to extend in an axial direction of the outer circumferential portion, and disposed at predetermined intervals in a circumferential direction of the outer circumferential portion, wherein the valve chamber of the valve case comprises ribs formed on the inner circumference of the valve chamber to project therefrom in a radial inner direction of the valve case, and disposed to each pass through the opening portions of the valve element to limit a movement of the positive pressure spring in a radial direction, and wherein, in the radial direction, the positive pressure spring is exposed to outside of the opening portions.

* * * * *